(12) United States Patent
Choi et al.

(10) Patent No.: US 12,135,425 B2
(45) Date of Patent: Nov. 5, 2024

(54) WAVEGUIDE STRUCTURE, BACK LIGHT UNIT INCLUDING THE SAME, AND DISPLAY APPARATUS INCLUDING THE WAVEGUIDE STRUCTURE

(71) Applicant: SAMSUNG ELECTRONICS CO., LTD., Suwon-si (KR)

(72) Inventors: Chilsung Choi, Suwon-si (KR); Hoon Song, Yongin-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 432 days.

(21) Appl. No.: 17/375,822

(22) Filed: Jul. 14, 2021

(65) Prior Publication Data
US 2022/0113540 A1    Apr. 14, 2022

(30) Foreign Application Priority Data
Oct. 14, 2020    (KR) .................. 10-2020-0132981

(51) Int. Cl.
*G02B 6/00*    (2006.01)
*F21V 8/00*    (2006.01)
(Continued)

(52) U.S. Cl.
CPC ....... *G02B 27/0103* (2013.01); *G02B 5/1842* (2013.01); *G02B 5/3058* (2013.01);
(Continued)

(58) Field of Classification Search
CPC ............... G02B 5/3058; G02B 5/1842; G02B 6/0056; G02B 6/0061; G02B 6/0076; G02B 27/0103; G02B 30/25; G02B 30/33
See application file for complete search history.

(56) References Cited

U.S. PATENT DOCUMENTS

| 10,768,357 B2 | 9/2020 | Fattal |
| 10,852,559 B2 | 12/2020 | Choi et al. |
| 2004/0141108 A1* | 7/2004 | Tanaka ............... G02B 6/0065 349/96 |

(Continued)

FOREIGN PATENT DOCUMENTS

| CN | 111158078 A | 5/2020 |
| EP | 3690530 A1 | 8/2020 |

(Continued)

OTHER PUBLICATIONS

Communication dated Mar. 4, 2022 issued by the European Patent Office in European Application No. 21202614.0.

*Primary Examiner* — Paisley L Wilson
(74) *Attorney, Agent, or Firm* — Sughrue Mion, PLLC

(57) ABSTRACT

Provided is a waveguide structure including an output grating, a polarization conversion element provided parallel to the output grating, and a polarization separation element provided between the output grating and the polarization conversion element, wherein the polarization separation element is configured to transmit, to the output grating, light having a first polarization direction among light incident on the polarization separation element, and reflect, to the polarization conversion element, light having a second polarization direction different from the light having the first polarization direction among the light incident on the polarization separation element.

17 Claims, 12 Drawing Sheets

(51) Int. Cl.
 G02B 5/18 (2006.01)
 G02B 5/30 (2006.01)
 G02B 6/27 (2006.01)
 G02B 27/01 (2006.01)
 G02B 30/25 (2020.01)
 G02B 30/33 (2020.01)

(52) U.S. Cl.
 CPC ......... G02B 6/0056 (2013.01); G02B 6/0061 (2013.01); G02B 6/0076 (2013.01); G02B 6/2726 (2013.01); G02B 30/25 (2020.01); G02B 30/33 (2020.01)

(56) References Cited

U.S. PATENT DOCUMENTS

| | | |
|---|---|---|
| 2005/0123229 A1 | 6/2005 | Huck et al. |
| 2012/0002256 A1 | 1/2012 | Lacoste et al. |
| 2014/0140653 A1 | 5/2014 | Brown et al. |
| 2016/0041387 A1 | 2/2016 | Valera et al. |
| 2018/0088325 A1* | 3/2018 | Brown .................. G02B 27/30 |
| 2019/0285796 A1 | 9/2019 | Waldern et al. |
| 2020/0150587 A1 | 5/2020 | Choi et al. |
| 2020/0292745 A1 | 9/2020 | Waldern et al. |
| 2021/0088788 A1 | 3/2021 | Choi et al. |

FOREIGN PATENT DOCUMENTS

| | | |
|---|---|---|
| JP | 6511144 B2 | 5/2019 |
| KR | 10-2019-0018344 A | 2/2019 |
| KR | 10-2102888 B1 | 4/2020 |
| WO | 2013163347 A1 | 10/2013 |

* cited by examiner

WAVEGUIDE STRUCTURE, BACK LIGHT UNIT INCLUDING THE SAME, AND DISPLAY APPARATUS INCLUDING THE WAVEGUIDE STRUCTURE

CROSS-REFERENCE TO RELATED APPLICATION

This application is based on and claims priority under 35 U.S.C. § 119 to Korean Patent Application No. 10-2020-0132981, filed on Oct. 14, 2020, in the Korean Intellectual Property Office, the disclosure of which is incorporated by reference herein in its entirety.

BACKGROUND

1. Field

Example embodiments of the present disclosure relate to a waveguide structure, a backlight unit, and a display apparatus.

2. Description of Related Art

Glasses-based methods and glasses-free methods are widely commercialized and used for displaying three-dimensional (3D) images. Glasses-based methods include polarized glasses methods and shutter glasses methods, and glasses-free methods include lenticular methods and parallax barrier methods. These methods use the binocular parallax of the two eyes, and since there is a limit to the increase of the number of viewpoints and also the depth of the brain and the focus of the eye do not match each other, viewers who see a 3D image via these methods may feel tired.

As a 3D image display method capable of providing full parallax wherein the depth perceived by the brain and the focus of the eyes match each other, a holographic display method is gradually becoming practical. The holographic display method uses the principle of reproducing an image of an original object by radiating and diffracting reference light onto a hologram pattern on which an interference pattern obtained by interfering the object light reflected from the original object and the reference light is recorded. The holographic display method currently in practical use provides a computer generated hologram (CGH) as an electrical signal to a spatial light modulator rather than directly exposing the original object to obtain a holographic pattern. According to the inputted CGH signal, the spatial light modulator forms a hologram pattern and diffracts the reference light, thereby generating a 3D image.

However, in order to implement a complete holographic display method, a spatial light modulator having very high resolution and processing of a very large amount of data are required. Recently, in order to alleviate the conditions of data throughput and resolution, a binocular hologram method has been proposed whereby holographic images are provided only in the viewing area corresponding to both eyes of an observer. For example, only a holographic image having a viewpoint corresponding to the viewer's left eye field of view and a holographic image having a viewpoint corresponding to the observer's right eye field of view are generated and provided to each of the observer's left and right eyes. In this case, since it is not necessary to generate holographic images for the remaining viewpoints, data throughput can be greatly reduced and even with the currently commercialized display apparatus, the resolution condition of the spatial light modulator can be satisfied.

On the other hand, compared to a backlight unit (BLU) used in a liquid crystal display (LCD), a BLU used in holographic displays uses light with high coherence. Regarding the BLU, grating is used to maintain the coherence of light emitted from the waveguide tube.

The BLU should emit light with uniform intensity. In order to match the uniformity of the emitted light, the light extraction efficiency of the output grating can be set differently for each area. For example, output grating in which light extraction efficiency increases along one direction may be used for the BLU. However, it is difficult to implement an output grating in which the light extraction efficiency is precisely adjusted due to problems in the manufacturing process.

SUMMARY

One or more example embodiments provide a waveguide structure including output grating that has a constant light extraction efficiency and emits light of a uniform intensity.

One or more example embodiments also provide a backlight unit including an output grating that has a constant light extraction efficiency and emits light of a uniform intensity.

One or more example embodiments also provide a display apparatus including a backlight unit that emits light of uniform intensity.

Additional aspects will be set forth in part in the description which follows and, in part, will be apparent from the description, or may be learned by practice of example embodiments.

According to an aspect of an example embodiment, there is provided a waveguide structure including an output grating, a polarization conversion element provided parallel to the output grating, and a polarization separation element provided between the output grating and the polarization conversion element, wherein the polarization separation element is configured to transmit, to the output grating, light having a first polarization direction among light incident on the polarization separation element, and reflect, to the polarization conversion element, light having a second polarization direction different from the light having the first polarization direction among the light incident on the polarization separation element.

The polarization separation element may include a reflective wire-grid polarizer.

The polarization separation element may include a polarization grating.

The waveguide structure may further include a quarter wave plate provided between the polarization separation element and the output grating.

The polarization separation element may include a dielectric coating.

The polarization conversion element may include a half wave plate or a full wave plate.

The polarization conversion element may include an active wave plate.

The output grating may include a volume grating.

The output grating may have a uniform light extraction efficiency.

The polarization conversion element may include a first area having a first light transfer efficiency, and a second area having a second light transfer efficiency that is greater than the first light transfer efficiency.

The waveguide structure may further include a first input grating provided on a first surface of the polarization conversion element, wherein the first input grating is configured to provide light to the polarization separation element, and wherein the first area is closer to the first input grating than the second area.

The waveguide structure may further include a first waveguide layer provided between the polarization separation element and the polarization conversion element, and a second waveguide layer provided between the output grating and the polarization separation element.

A refractive index of the first waveguide layer may be equal to a refractive index of the second waveguide layer.

The waveguide structure may further include a third waveguide layer provided between the first waveguide layer and the polarization conversion element, wherein a refractive index of the third waveguide layer is greater than a refractive index of the first waveguide layer.

The waveguide structure may further include a first input grating configured to provide light to the polarization separation element, a second input grating configured to provide light provided from outside to the first waveguide layer and the second waveguide layer, and a third input grating configured to reflect light provided from the second input grating and provide the reflected light to the first input grating, wherein, in a stacking direction of the first waveguide layer and the second waveguide layer, the first input grating, the second input grating, and the third input grating are spaced apart from the polarization separation element.

According to another aspect of an example embodiment, there is provided a waveguide structure including a first waveguide layer, a second waveguide layer provided on the first waveguide layer, and an output grating provided on the second waveguide layer, wherein a refractive index of the first waveguide layer is greater than a refractive index of the second waveguide layer, and wherein a thickness of the second waveguide layer is set such that evanescent waves formed in the second waveguide layer by light totally reflected at an interface between the first waveguide layer and the second waveguide layer is provided to the output grating.

A thickness of the second waveguide layer may increase in one direction.

The waveguide structure may further include a third waveguide layer provided on a first side of the first waveguide layer, wherein the second waveguide layer is provided on a second side of the first waveguide layer opposite to the first side of the first waveguide layer, and wherein a refractive index of the third waveguide layer is greater than a refractive index of the first waveguide layer.

According to yet another aspect of an example embodiment, there is provided a backlight unit including a light source, and a waveguide structure including an output grating, a polarization conversion element provided parallel to the output grating, and a polarization separation element provided between the output grating and the polarization conversion element, wherein the polarization separation element is configured to transmit, to the output grating, light having a first polarization direction among light incident on the polarization separation element, and reflect, to the polarization conversion element, light having a second polarization direction different from the light having the first polarization direction among the light incident on the polarization separation element, and wherein the waveguide structure is configured to expand light provided from the light source and output light of a uniform intensity.

According to yet another aspect of an example embodiment, there is provided a display apparatus including a light source, a waveguide structure including an output grating, a polarization conversion element provided parallel to the output grating, and a polarization separation element provided between the output grating and the polarization conversion element, wherein the polarization separation element is configured to transmit, to the output grating, light having a first polarization direction among light incident on the polarization separation element, and reflect, to the polarization conversion element, light having a second polarization direction different from the light having the first polarization direction among the light incident on the polarization separation element, wherein the waveguide structure is configured to expand light provided from the light source and output light of a uniform intensity, and a spatial light modulator configured to diffract light provided from the waveguide structure to provide a holographic image.

According to yet another aspect of an example embodiment, there is provided a waveguide structure including an output grating, a polarization conversion element provided parallel to the output grating, an input grating provided adjacent to the polarization conversion element, and a polarization separation element provided between the output grating and the polarization conversion element, the polarization separation element including a first area and a second area, wherein the first area of the polarization separation element is closer to the input grating than the second area of the polarization separation element, and wherein a first light transfer efficiency of the first area is less that a second light transfer efficiency of the second area.

BRIEF DESCRIPTION OF THE DRAWINGS

The above and other aspects, features, and advantages of example embodiments of the disclosure will be more apparent from the following description taken in conjunction with the accompanying drawings, in which.

DETAILED DESCRIPTION

Figure 1:
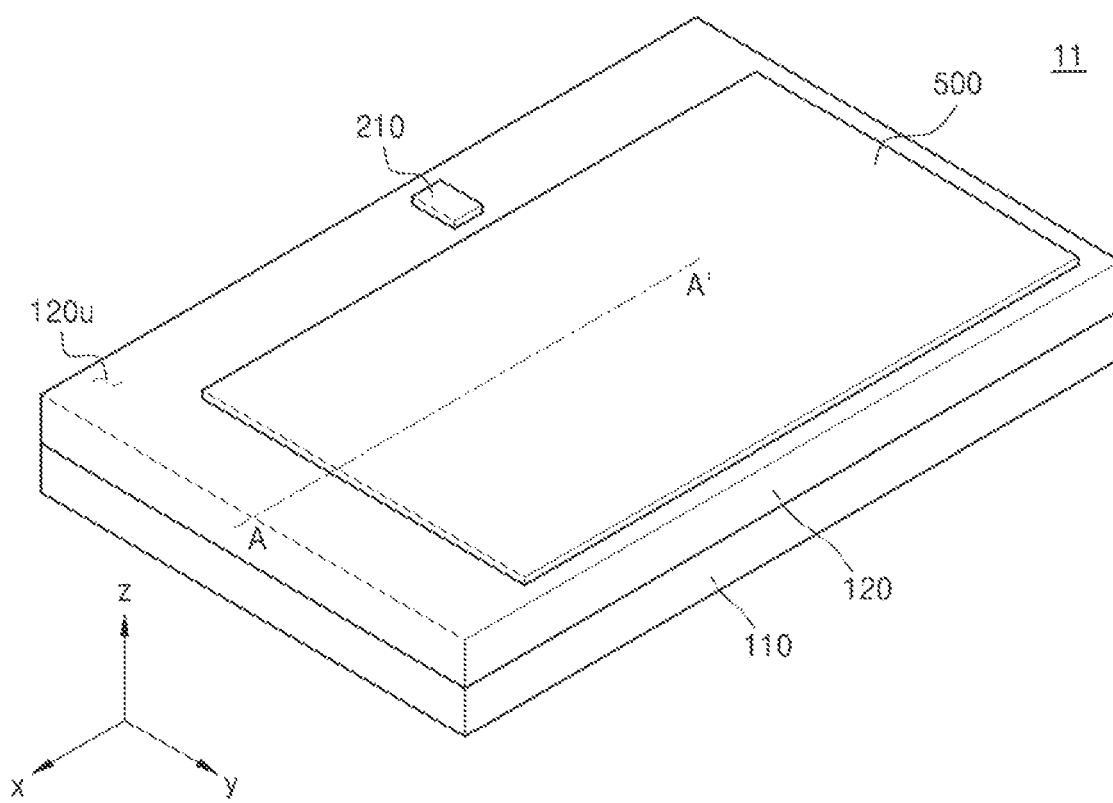
FIG. 1 is a perspective view of a waveguide structure according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

Hereinafter, example embodiments of the disclosure will be described in detail with reference to the accompanying drawings. In the following drawings, the same reference numerals refer to the same components, and the size of each component in the drawings may be exaggerated for clarity and convenience of description. Further, the example embodiments described below are merely example, and various modifications are possible from these example embodiments.

Hereinafter, what is described as "on" may include not only those directly above by contact, but also those above non-contact.

The terms of a singular form may include plural forms unless otherwise specified. In addition, when a certain part "includes" a certain component, it means that other components may be further included rather than excluding other components unless otherwise stated.

In addition, terms such as " . . . unit" described in the specification mean a unit that processes at least one function or operation.

Figure 2:
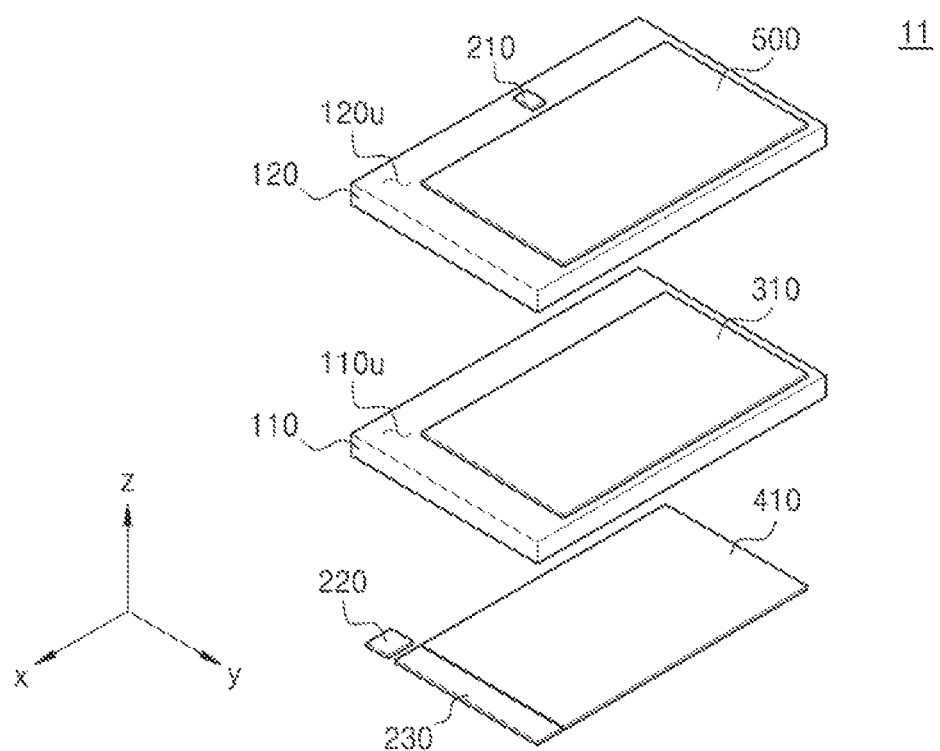
FIG. 2 is an exploded perspective view of the waveguide structure of FIG. 1.
Figure 3:
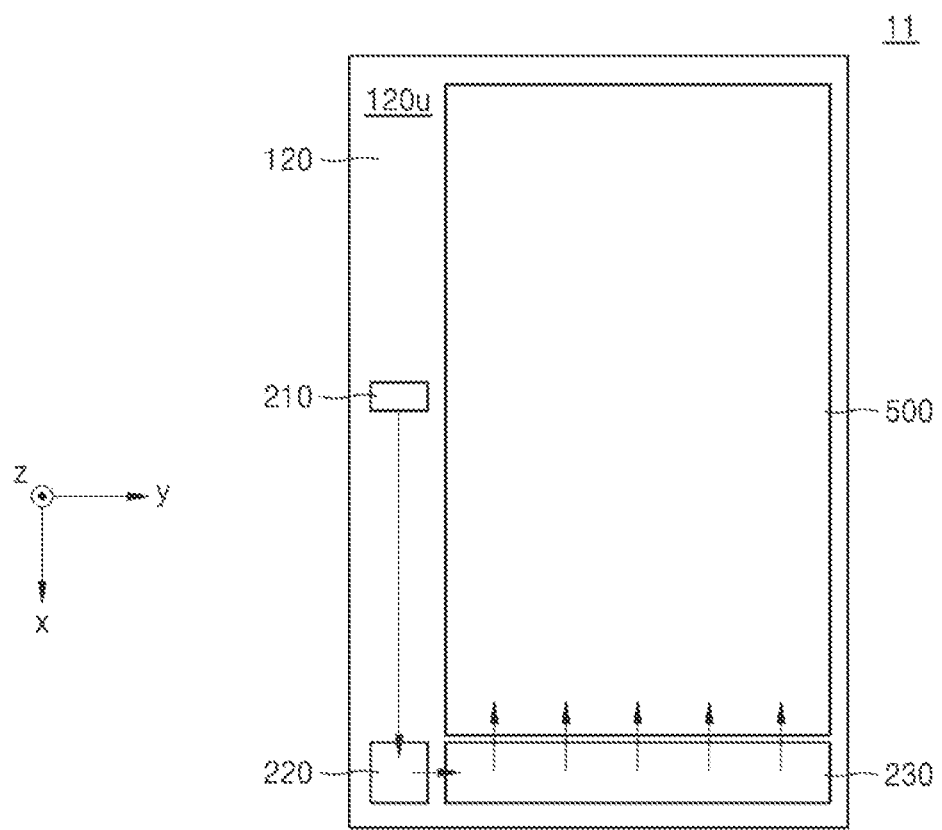
FIG. 3 is a plan view of the waveguide structure of FIG. 1.
Figure 4:
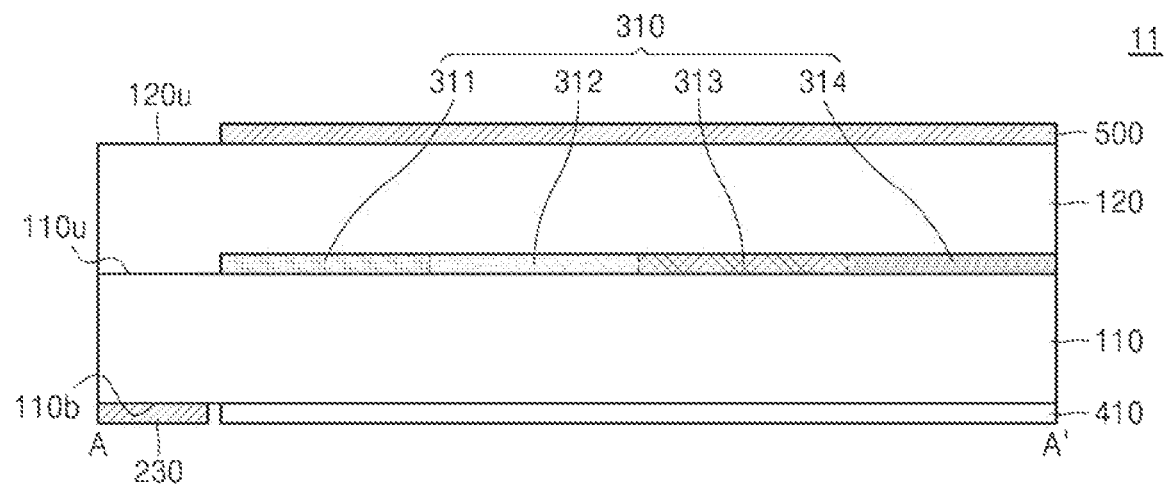
FIG. 4 is a cross-sectional view of the waveguide structure of FIG. 1, taken along line A-A' of FIG. 1.
Figure 5:
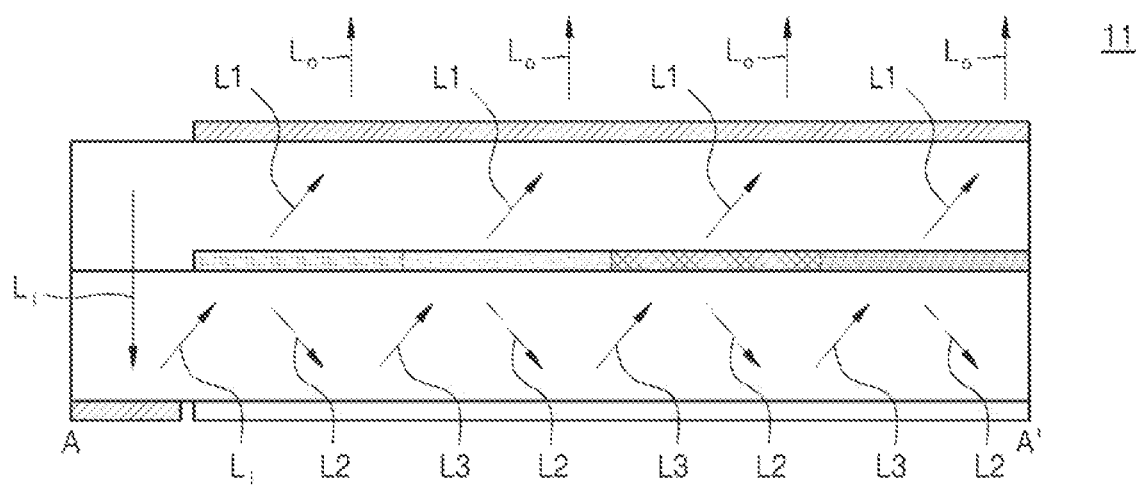
FIG. 5 is a cross-sectional view of the waveguide structure of FIG. 1, taken along line A-A' of FIG. 1 illustrating the path of light in the waveguide structure of FIG. 1.

FIG. 1 is a perspective view of a waveguide structure 11 according to an example embodiment. FIG. 2 is an exploded perspective view of FIG. 1. FIG. 3 is a plan view of FIG. 1. FIG. 4 is a cross-sectional view taken along line A-A' of the waveguide structure of FIG. 1. FIG. 5 is a cross-sectional view taken along line A-A' of FIG. 1 illustrating the path of light in the waveguide structure 11 of FIG. 1.

Referring to FIGS. 1 to 5, the waveguide structure 11 may be provided. The waveguide structure 11 may include a first waveguide layer 110, a second waveguide layer 120, a first input grating 210, a second input grating 220, a third input grating 230, a first polarization separation element 310, a first polarization conversion element 410, and an output grating 500. The first waveguide layer 110 and the second waveguide layer 120 may guide light through total internal reflection. The first waveguide layer 110 and the second waveguide layer 120 may be stacked along a height direction (i.e., z direction). The first waveguide layer 110 and the second waveguide layer 120 may include resin or glass that transmits light in the range of about 400 nm to about 2000 nm. The first waveguide layer 110 and the second waveguide layer 120 may have a refractive index in the range of about 1.2 to about 2.0. The first waveguide layer 110 and the second waveguide layer 120 may have substantially the same refractive index.

The first input grating 210 may be provided on the upper surface 120u of the second waveguide layer 120. The first input grating 210 may face a light source outside the waveguide structure 11. The first input grating 210 may diffract light provided from a light source and provide the diffracted light to the second waveguide layer 120. For example, from a viewpoint along the z direction, light incident on the first input grating 210 along the −z direction may travel in the x direction by the first input grating 210. The first input grating 210 may provide light to the second input grating 220. Light may travel from the first input grating 210 to the second input grating 220 using total internal reflection.

The second input grating 220 may be provided on the bottom surface 110b of the first waveguide layer 110. From the viewpoint along the z direction, the second input grating 220 may be spaced apart from the first input grating 210 along the x direction. The second input grating 220 may convert a path of light transmitted from the first input grating 210. From the viewpoint along the z direction, the path of light may be changed from the x direction to the y direction by the second input grating 220. The second input grating 220 may transmit the light in the x direction. The second input grating 220 may provide light to the third input grating 230. Light may travel from the second input grating 220 to the third input grating 230 using total internal reflection.

The third input grating 230 may be provided on the bottom surface of the first waveguide layer 110. The third input grating 230 may be spaced apart from the second input grating 220 along the y direction. The third input grating 230 may reflect light Li transmitted from the second input grating 220. From the viewpoint along the z direction, the third input grating 230 may change the path of the light Li from the y direction to the −x direction. The third input grating 230 may provide light Li to the first polarization separation element 310. The third input grating 230 may transmit the light Li in the y direction.

The first polarization separation element 310 may transmit light L1 having a first polarization direction among the light Li provided from the third input grating 230, and reflect light L2 having a second polarization direction different from the first polarization direction. For example, the first polarization separation element 310 may include a reflective wire-grid polarizer. For example, the first polarization direction may be parallel to the y direction, and the second polarization direction may be parallel to the x direction. Light L1 having a first polarization direction may be provided to the output grating 500, and light L2 having a second polarization direction may be provided to the first polarization conversion element 410.

The first polarization separation element 310 may include a first area 311, a second area 312, a third area 313, and a fourth area 314 having different transmission/reflection ratios. The transmission/reflection ratio may be a ratio of the intensity of light reflected by the first polarization separation element 310 and the intensity of light transmitted by the first polarization separation element 310. The transmission/reflection ratio corresponds to a transmission efficiency of each of the first area 311, the second area 312, the third area 313, and the fourth area 314. The transmission/reflection ratio can be expressed by the following Equation 1.

Transmission/reflection ratio=(Intensity of light transmitted by the light separation element 310)/(Intensity of light reflected by the light separation element 310)     [Equation 1]

The first area 311, the second area 312, the third area 313, and the fourth area 314 may be arranged along the y direction. The first area 311 may be closest to the third input grating 230, and the fourth area 314 may be disposed farthest from the third input grating 230. For example, the transmission/reflection ratio may increase from the first area 311 to the fourth area 314. Light reflected from the third input grating 230 may be provided to the first area 311. Accordingly, light of the strongest intensity may be provided to the first area 311. Light of the weakest intensity may be provided to the fourth area 314. The transmission/reflection ratio of each of the first to fourth areas 311, 312, 313, and 314 may be determined so that the first to fourth areas 311, 312, 313, and 314 emit light having a constant intensity.

The first polarization conversion element 410 may be provided on the bottom surface 110b of the first waveguide layer 110. The first polarization conversion element 410 may face the first polarization separation element 310. For example, the first polarization conversion element 410 may be disposed parallel to the first polarization separation element 310. The first polarization conversion element 410 may be spaced apart from the third input grating 230 in the −x direction. The first polarization conversion element 410 may change and reflect a polarization direction of light incident on the first polarization conversion element 410 (i.e., light L2 having a second polarization direction). For example, the first polarization conversion element 410 may include a half wave plate or a full wave plate. When light L2 having a second polarization direction is provided to the first polarization conversion element 410, the polarization direction of the light L2 having the second polarization direction is rotated by a predetermined angle, so that light L3 having a third polarization direction different from the first polarization direction and the second polarization direction may be generated. Light L3 having a third polarization direction may be provided to the first polarization separation element 310. The light L3 having a third polarization direction may be separated into light L1 having a first polarization direction and light L2 having a second polarization direction by the first polarization separation element 310. Rotation of polarization of light L2 by the first polarization conversion element 410 and separation of polarization of light L3 by the first polarization separation element 310 may be repeated. As light travels in the −x direction within the first waveguide layer 110, the intensity may gradually decrease in the −x direction. Accordingly, the light of the highest intensity may be provided to the first area 311 and the light of the weakest intensity may be provided to the fourth area 314.

The output grating 500 may be provided on the upper surface 120u of the second waveguide layer 120. The output grating 500 may output the light L1 provided from the first polarization separation element 310 to the outside of the backlight unit 1. The output grating 500 may have uniform light extraction efficiency. For example, the output grating 500 may have a light extraction efficiency of substantially 100%. The actual 100% light extraction efficiency may include not only the light extraction efficiency of exactly 100%, but also the light extraction efficiency close to 100%. The output grating 500 may emit all of the light L1 provided from the first polarization separation element 310. Since the first to fourth areas 311, 312, 313, and 314 provide light of uniform intensity to the output grating 500, the output grating 500 may emit light $L_O$ of uniform intensity.

The first input grating 210, the second input grating 220, the third input grating 230, and the output grating 500 may be formed of various types of surface gratings or volume gratings. The surface grating is a grating formed directly on the surface of a substrate, and may include, for example, a diffractive optical element (DOE) such as a binary phase grating, a blazed grating, or the like. A plurality of grating patterns of the DOE act as a diffraction grating to diffract incident light. For example, depending on the size, height, period, duty ratio, shape, etc. of the grating patterns, the incident light is diffracted in a specific angular range to cause extinction and constructive interference, so that the direction of light can be changed. The volume grating can be formed separately from the substrate, and may include, for example, a holographic optical element (HOE), a geometric phase grating, a Bragg polarization grating, a holographically formed polymer dispersed liquid crystal (H-PDLC), and the like. This volume grating may include periodic fine patterns of materials having different refractive indices.

The example embodiment may provide a waveguide structure 11 including a first polarization separation element 310 having different transmission/reflection ratios for each area of the first polarization separation element 310 and an output grating 500 having uniform light extraction efficiency. The waveguide structure 11 may emit light of uniform intensity.

Figure 6:
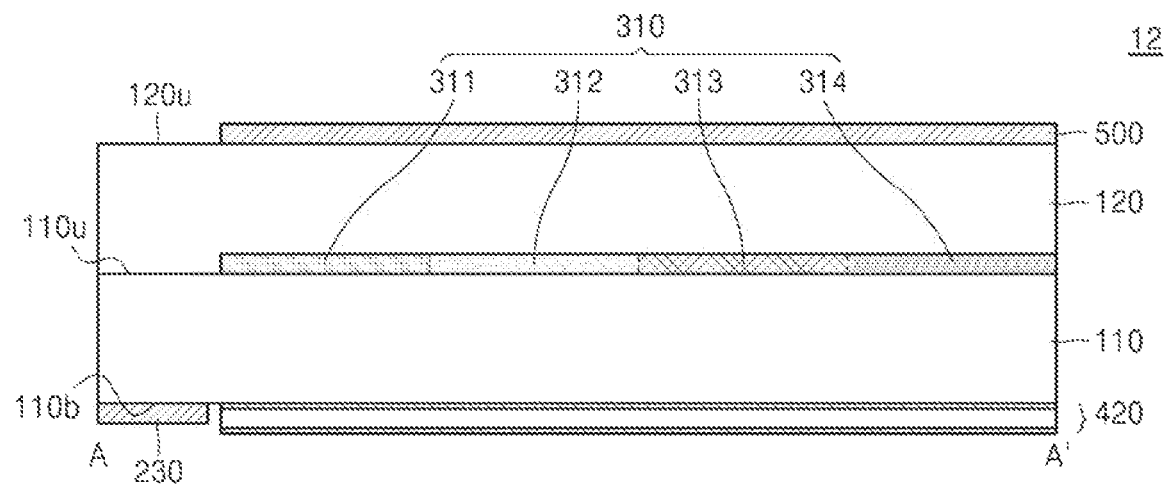
FIG. 6 is a cross-sectional view of a waveguide structure according to an example embodiment, the cross-sectional view corresponding to a cross-sectional view taken along line A-A' of FIG. 1.
Figure 6:
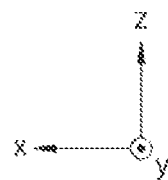
Figure 7:
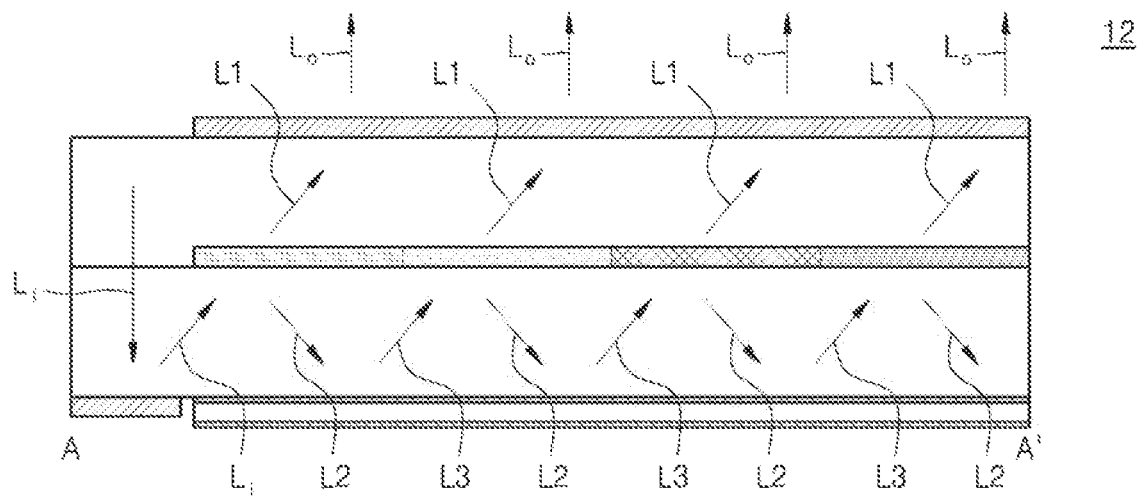
FIG. 7 is a cross-sectional view of the waveguide structure of FIG. 6, taken along line A-A' of FIG. 1 illustrating the path of light in the waveguide structure of FIG. 6.
Figure 7:
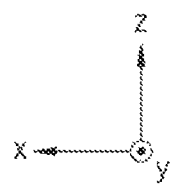

FIG. 6 is a cross-sectional view corresponding to line A-A' in FIG. 1 illustrating a waveguide structure 12 according to an example embodiment. FIG. 7 is a cross-sectional view corresponding to line A-A' of FIG. 1 illustrating the path of light in the waveguide structure of FIG. 6. For the concise description, contents substantially the same as those described with reference to FIGS. 1 to 5 may not be described.

Referring to FIGS. 1, 6, and 7, the waveguide structure 12 may include the first waveguide layer 110, the second waveguide layer 120, the first input grating 210, the second input grating 220, the third input grating 230, the first polarization separation element 310, a second polarization conversion element 420, and the output grating 500. The first waveguide layer 110, the second waveguide layer 120, the first input grating 210, the second input grating 220, the third input grating 230, the first polarization separation element 310, and the output grating 500 may be substantially the same as those described with reference to FIGS. 1 to 5.

The second polarization conversion element 420 may be provided on the bottom surface 110b of the first waveguide layer 110. The second polarization conversion element 420 may face the first polarization separation element 310. For example, the second polarization conversion element 420 may be disposed parallel to the first polarization separation element 310. The second polarization conversion element 420 may be spaced apart from the third input grating 230 in the −x direction. The second polarization conversion element 420 may change and reflect a polarization direction of light incident on the second polarization conversion element 420, for example, light L2 having a second polarization direction. For example, the second polarization conversion element 420 may include an active wave plate. The second polarization conversion element 420 may be controlled by a controller to adjust the degree of polarization rotation of light incident on the second polarization conversion element 420. When light L2 having a second polarization direction is provided to the second polarization conversion element 420, the polarization direction of the light L2 having the second polarization direction is rotated by a predetermined angle, so that light L3 having a third polarization direction different from the first polarization direction and the second polarization direction may be generated. Light L3 having a third polarization direction may be provided to the first polarization separation element 310. The light L3 having a third polarization direction may be separated into light L1 having a first polarization direction and light L2 having a second polarization direction by the first polarization separation element 310. Rotation of polarization of light L2 by the second polarization conversion element 420 and separation of polarization of light L3 by the first polarization separation element 310 may be repeated. As light travels in the −x direction within the first waveguide layer 110, the intensity may gradually decrease in the −x direction. Accordingly, the light of the highest intensity may be provided to the first area 311 and the light of the weakest intensity may be provided to the fourth area 314.

The present disclosure may provide a waveguide structure 12 including a first polarization separation element 310 having different transmission/reflection ratios for each area and an output grating 500 having uniform light extraction efficiency. The waveguide structure 12 may emit light of uniform intensity.

Figure 8:
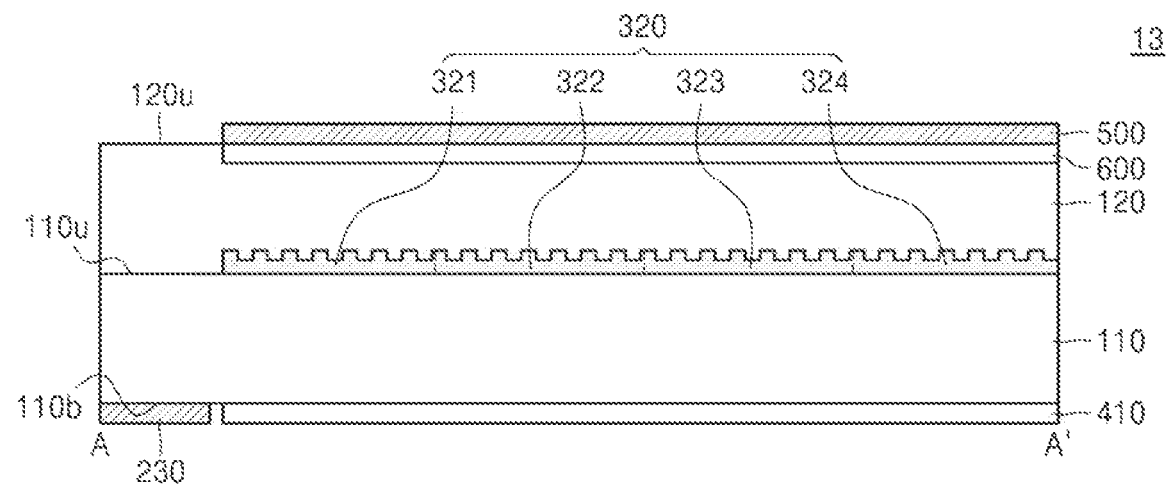
FIG. 8 is a cross-sectional view of a waveguide structure according to an example embodiment, the cross-sectional view corresponding to a cross-sectional view taken along line A-A' of FIG. 1.
Figure 8:
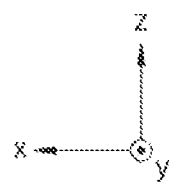
Figure 9:
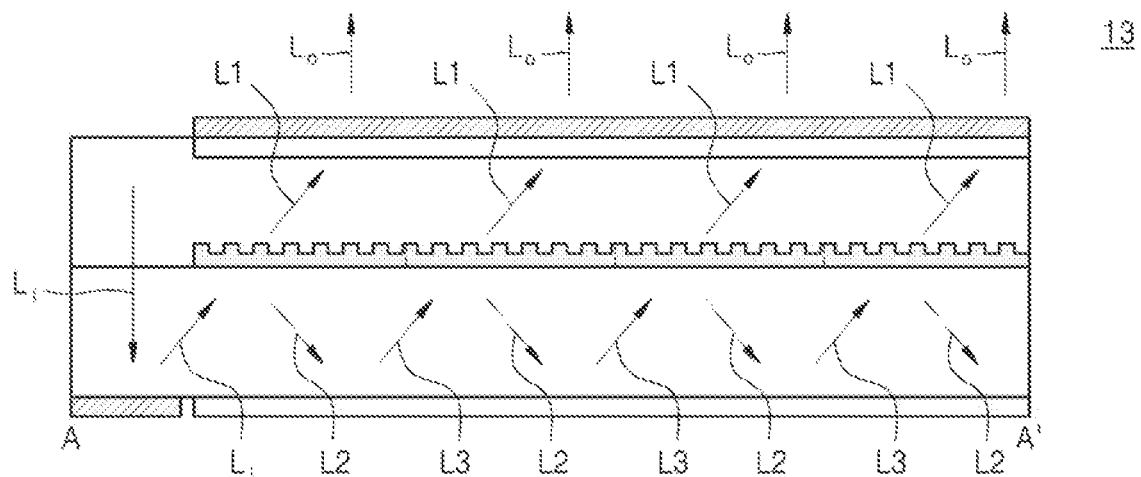
FIG. 9 is a cross-sectional view of the waveguide structure of FIG. 8, taken along line A-A' of FIG. 1 illustrating the path of light in the waveguide structure of FIG. 8.
Figure 9:
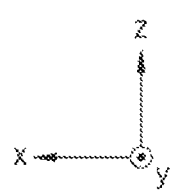

FIG. 8 is a cross-sectional view corresponding to line A-A' in FIG. 1 for explaining a waveguide structure 13 according to an example embodiment. FIG. 9 is a cross-sectional view corresponding to line A-A' of FIG. 8 for explaining the path of light in the waveguide structure 13 of FIG. 1. For the concise description, contents substantially the same as those described with reference to FIGS. 1 to 5 may not be described.

Referring to FIGS. 1, 8, and 9, the waveguide structure 13 may include the first waveguide layer 110, the second waveguide layer 120, the first input grating 210, the second input grating 220, the third input grating 230, a second polarization separation element 320, the first polarization conversion element 410, a circularly polarized light-linearly polarized light conversion element 600, and the output grating 500. The first waveguide layer 110, the second waveguide layer 120, the first input grating 210, the second input grating 220, the third input grating 230, the first polarization conversion element 410, and the output grating 500 may be substantially the same as those described with reference to FIGS. 1 to 5.

The second polarization separation element 320 may transmit light L1 having a first polarization direction among the light Li provided from the third input grating 230, and convert the polarization of the light L1 having the first polarization direction into circular polarization. The second polarization separation element 320 may provide light having circular polarization to the circularly polarized light-linearly polarized light conversion element 600. For example, the second polarization separation element 320 may include polarization grating.

The second polarization separation element 320 may include a first area 321, a second area 322, a third area 323, and a fourth area 324 having different transmission/reflection ratios. The first area 321, the second area 322, the third area 323, and the fourth area 324 may be arranged along the −x direction. The first area 321 may be closest to the third input grating 230, and the fourth area 324 may be disposed farthest from the third input grating 230. For example, the transmission/reflection ratio may increase from the first area 321 to the fourth area 324. Light reflected from the third input grating 230 may be provided to the first area 321. Accordingly, light of the strongest intensity may be provided to the first area 321. Light of the weakest intensity may be provided to the fourth area 324. The transmission/reflection ratio of the first to fourth areas 321, 322, 323, and 324 may be determined so that the first to fourth areas 321, 322, 323, and 324 emit light having a constant intensity.

A circular polarization-linear polarization conversion element 600 may be provided between the second polarization separation element 320 and the output grating 500. The circularly polarized light-linearly polarized light conversion element 600 may convert the polarization of light to have linear polarization from circular polarization. For example, the circularly polarized light-linearly polarized light conversion element 600 may include a quarter wave plate. The circularly polarized light-linearly polarized light conversion element 600 may provide light having linear polarization to the output grating 500.

The example embodiment may provide a waveguide structure 13 including a second polarization separation element 320 having different transmission/reflection ratios for each area and an output grating 500 having uniform light extraction efficiency. The waveguide structure 13 may emit light of uniform intensity.

Figure 10:
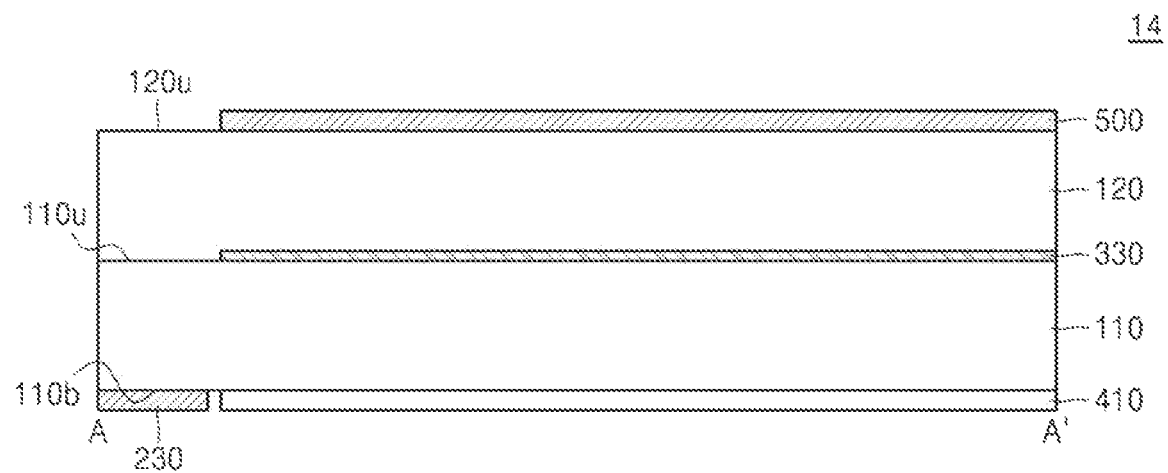
FIG. 10 is a cross-sectional view of a waveguide structure according to an example embodiment, the cross-sectional view corresponding to a cross-sectional view taken along line A-A' of FIG. 1.
Figure 11:
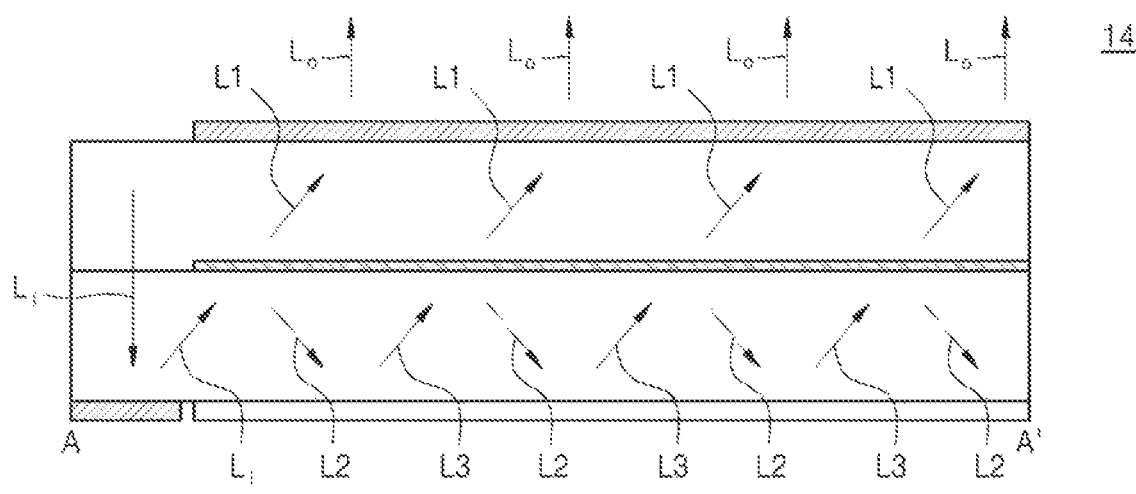
FIG. 11 is a cross-sectional view of the waveguide structure of FIG. 10, taken along line A-A' of FIG. 1 illustrating the path of light in the waveguide structure of FIG. 10.

FIG. 10 is a cross-sectional view corresponding to line A-A' in FIG. 1 for explaining a waveguide structure 14 according to an example embodiment. FIG. 11 is a cross-sectional view corresponding to line A-A' of FIG. 10 for explaining the path of light in the waveguide structure 14 of FIG. 1. For the concise description, contents substantially the same as those described with reference to FIGS. 1 to 5 may not be described.

Referring to FIGS. 10 and 11, the waveguide structure 14 may include the first waveguide layer 110, the second waveguide layer 120, the first input grating 210, the second input grating 220, the third input grating 230, a third polarization separation element 330, the first polarization conversion element 410, and the output grating 500. The first waveguide layer 110, the second waveguide layer 120, the first input grating 210, the second input grating 220, the third input grating 230, the first polarization conversion element 410, and the output grating 500 may be substantially the same as those described with reference to FIGS. 1 to 5.

The third polarization separation element 330 may transmit light having a first polarization direction among light Li provided from the third input grating 230 as light L1, and reflect light having a second polarization direction different from that of the first polarization direction as light L2. For example, the first polarization direction may be parallel to the y direction, and the second polarization direction may be parallel to the x direction. The third polarization separation element 330 may include a dielectric coating. For example, the third polarization separation element 330 may include a surface dielectric multilayer coating. The third polarization separation element 330 may have a different transmission/reflection ratio for each area. For example, the third polarization separation element 330 may have a transmission/reflection ratio increasing along the −x direction. For example, the transmission/reflection ratio of the third polarization separation element 330 may be adjusted by varying the number of multilayer films to be coated for each area. Light L1 having a first polarization direction may be provided to the output grating 500, and light L2 having a second polarization direction may be provided to the first polarization conversion element 410.

The example embodiment may provide a waveguide structure 14 including a third polarization separation element 330 having different transmission/reflection ratios for each area and an output grating 500 having uniform light extraction efficiency. The waveguide structure 14 may emit light $L_O$ of uniform intensity.

Figure 12:
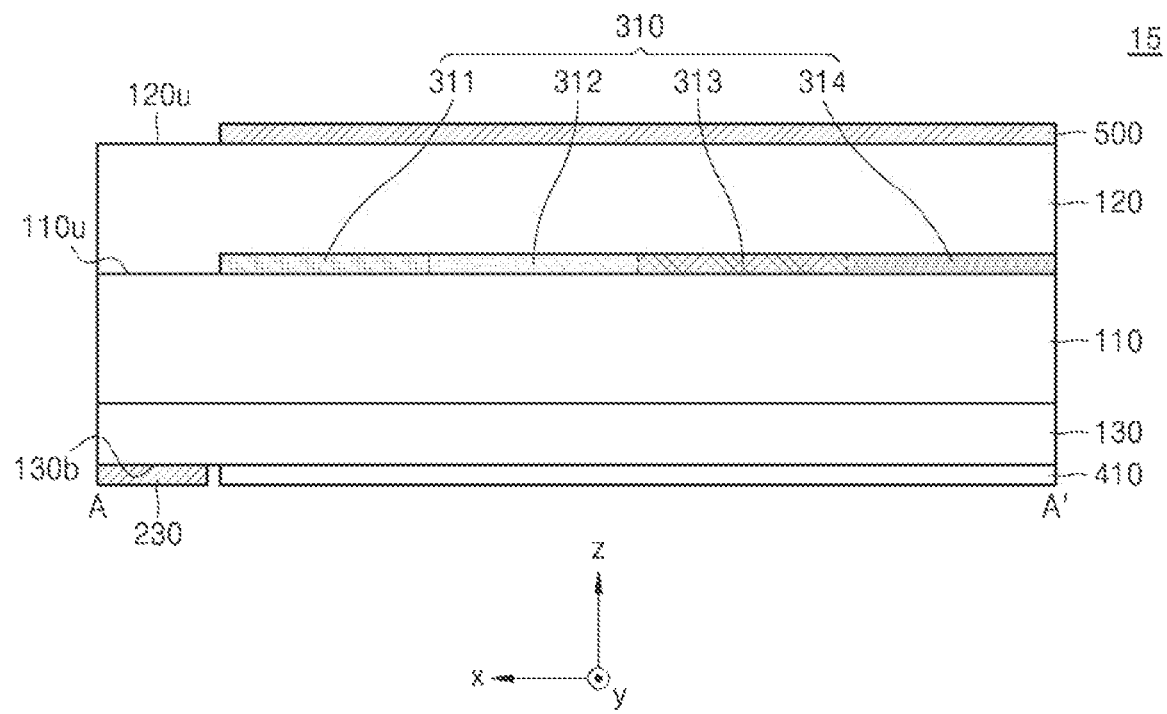
FIG. 12 is a cross-sectional view of a waveguide structure according to an example embodiment, the cross-sectional view corresponding to a cross-sectional view taken along line A-A' of FIG. 1.
Figure 13:
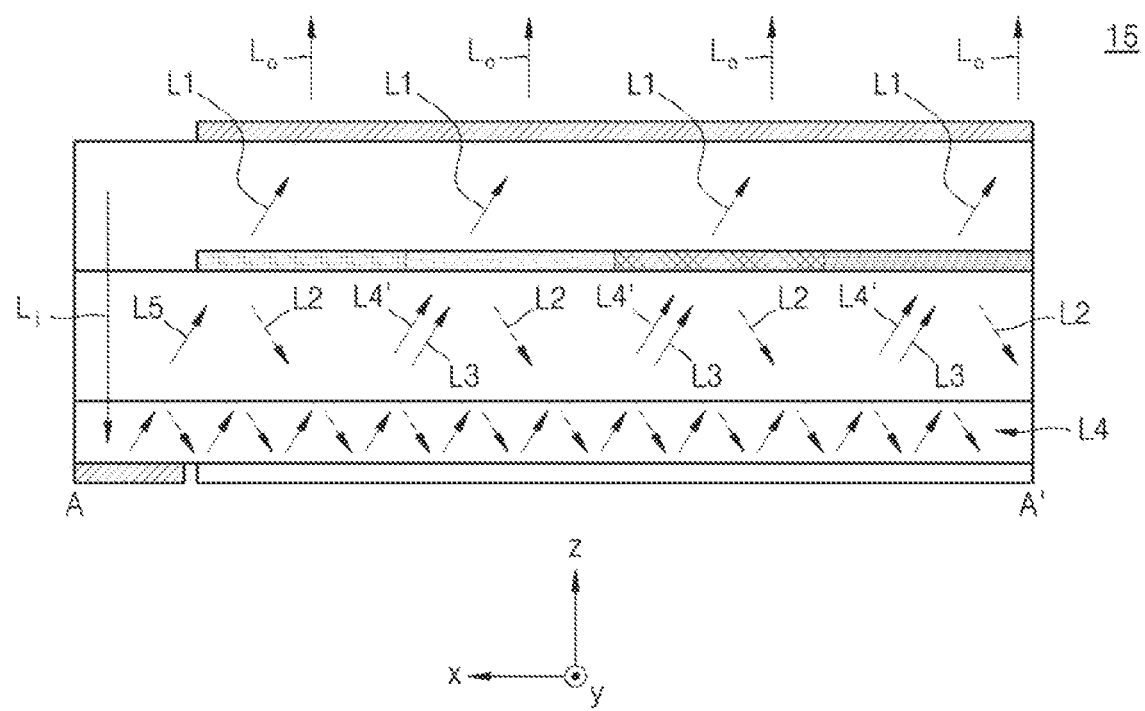
FIG. 13 is a cross-sectional view of the waveguide structure of FIG. 12, taken along line A-A' of FIG. 1 illustrating the path of light in the waveguide structure of FIG. 12.

FIG. 12 is a cross-sectional view corresponding to line A-A' in FIG. 1 for explaining a waveguide structure 15 according to an example embodiment. FIG. 13 is a cross-sectional view corresponding to line A-A' of FIG. 12 for explaining the path of light in the waveguide structure 15 of FIG. 1. For the concise description, contents substantially the same as those described with reference to FIGS. 1 to 5 may not be described.

Referring to FIGS. 1, 12, and 13, the waveguide structure 15 may include the first waveguide layer 110, the second waveguide layer 120, a third waveguide layer 130, the first input grating 210, the second input grating 220, the third input grating 230, the first polarization separation element 310, the first polarization conversion element 410, and the output grating 500. The first waveguide layer 110, the second waveguide layer 120, the first input grating 210, the second input grating 220, the third input grating 230, the first polarization separation element 310, the first polarization conversion element 410, and the output grating 500 may be substantially the same as those described with reference to FIGS. 1 to 5. However, the third input grating 230 and the first polarization conversion element 410 may be provided on the bottom surface 130u of the third waveguide layer 130.

The third waveguide layer 130 may be provided between the first waveguide layer 110 and the first polarization conversion element 410. The third waveguide layer 130 may extend between the first waveguide layer 110 and the third input grating 230 and may be provided between the first waveguide layer 110 and the third input grating 230. The third waveguide layer 130 may include resin or glass that transmits light in the range of about 400 nm to about 2000 nm. The third waveguide layer 130 may have a refractive index in the range of about 1.2 to about 2.0. The third waveguide layer 130 may have a larger refractive index than the first waveguide layer 110. For example, the third waveguide layer 130 may have a refractive index greater than 0.2 or more than the first waveguide layer 110.

Due to the difference in refractive index between the third waveguide layer 130 and the first waveguide layer 110, a portion of light L5 (hereinafter, the first light L5) of the light Li reflected from the third input grating 230 passes through the interface between the third waveguide layer 130 and the first waveguide layer 110, and another portion of light L4 (hereinafter, second light L4) is reflected towards the first polarization conversion element 410.

The first polarization separation element 310 can transmit light L1 having a first polarization direction among the first light L5 and reflect light L2 having a second polarization direction different from the first polarization direction. Light L1 having a first polarization direction may be provided to the output grating 500, and light L2 having a second polarization direction may be provided to the third waveguide layer 130. The light L2 having the second polarization direction may pass through the third waveguide layer 130 as light the second L4 and reach the first polarization conversion element 410. The first polarization conversion element 410 may rotate and reflect the polarization direction of the light L2 having the second polarization direction by a predetermined angle. As described above, a polarization direction rotated by a predetermined angle from the second polarization direction may be a third polarization direction, and light having a third polarization direction is indicated as L3. Light L3 having a third polarization direction may pass through the third waveguide layer 130 and the first waveguide layer 110 and reach the first polarization separation element 310.

The second light L4 may travel along the third waveguide layer 130. The second light L4 may be reflected by the interface between the first waveguide layer 110 and the third waveguide layer 130 and the first polarization conversion element 410 and travel. Since a part of the second light L4 passes through the interface between the first waveguide layer 110 and the third waveguide layer 130, the intensity of the second light L4 may gradually decrease each time it reaches the interface. In FIG. 13, the second light passing through the interface between the first waveguide layer 110 and the third waveguide layer 130 is indicated as L4'. Since the second lights L4 and L4' are unpolarized light, the unpolarization state may be maintained regardless of the first polarization conversion element 410. The second light L4' may pass through the first waveguide layer 110 and reach the first polarization separation element 310.

The first polarization separation element 310 may pass light L1 having a first polarization direction and reflect light L2 having a second polarization direction in the light L3 and the second light L4' having the third polarization direction. The reflection of light and conversion of the polarization direction described above may be repeated.

When the light is separated by using the third waveguide layer 130 and the first waveguide layer 110, the boundary of the beams emitted from the output grating may be blurred.

The example embodiment may provide a waveguide structure 15 including a first polarization separation element 310 having different transmission/reflection ratios for each area and an output grating 500 having uniform light extraction efficiency. The waveguide structure 15 may emit light LO of uniform intensity.

Figure 14:
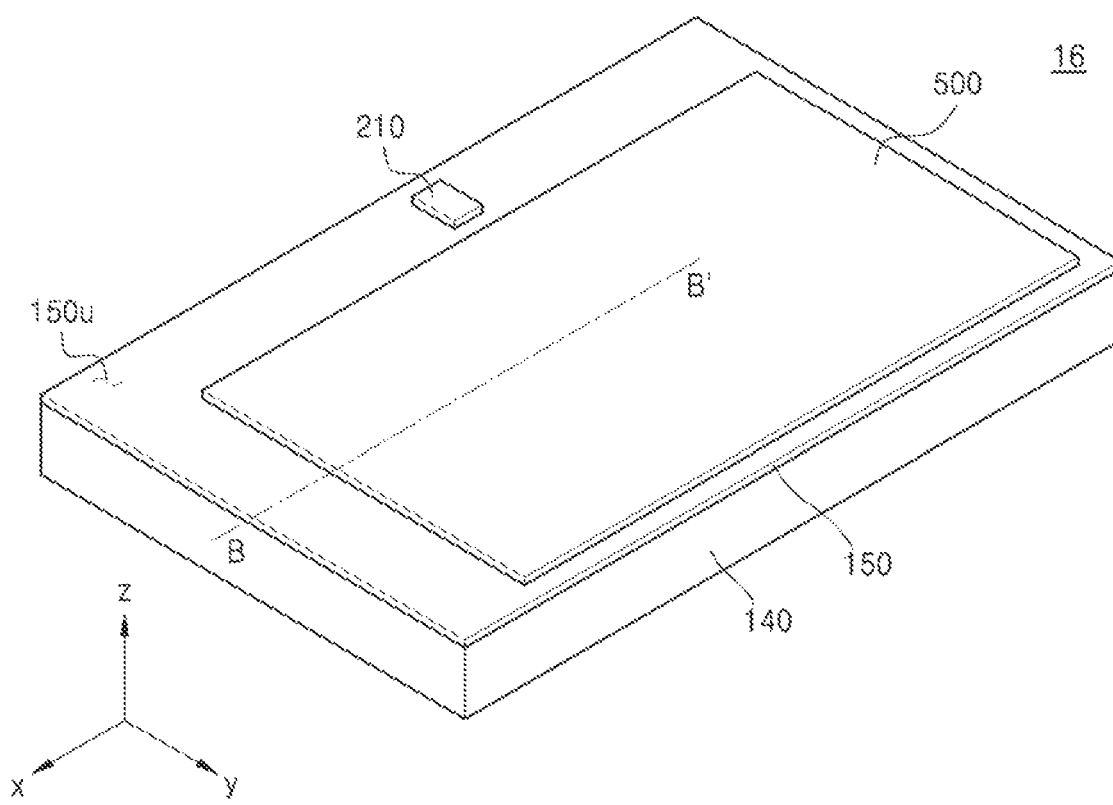
FIG. 14 is a perspective view of a waveguide structure according to an example embodiment.
Figure 15:
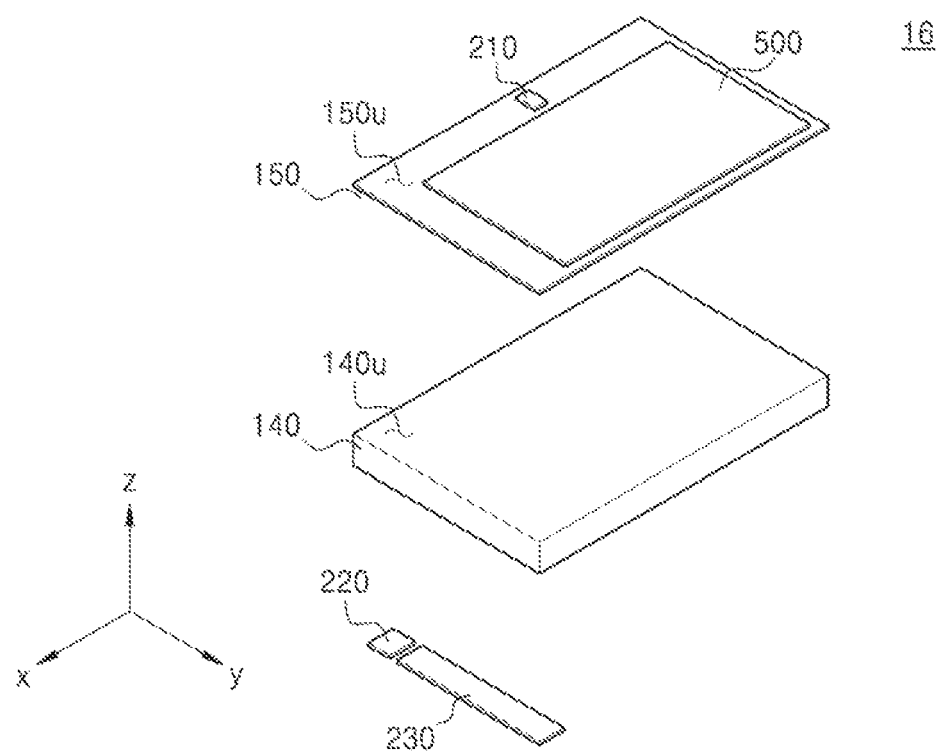
FIG. 15 is an exploded perspective view of the waveguide structure of FIG. 14.
Figure 16:
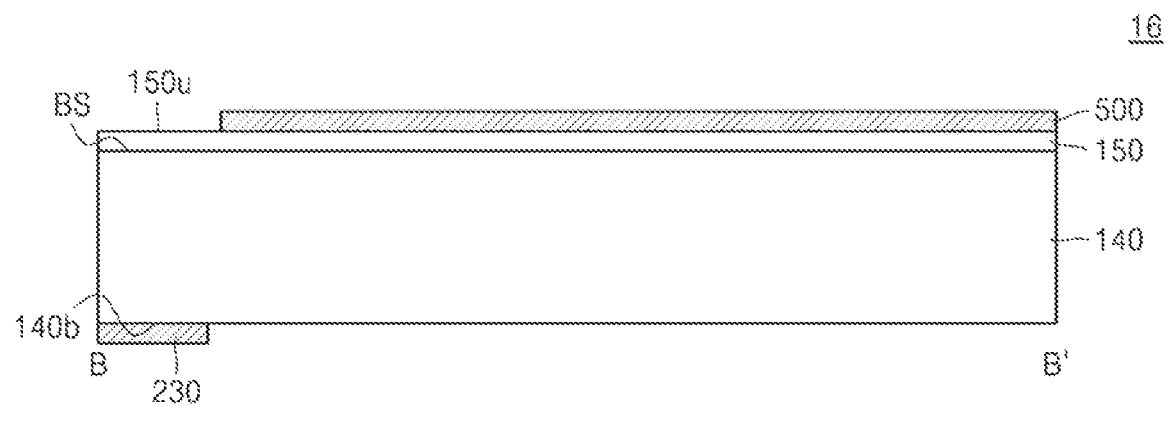
FIG. 16 is a cross-sectional view of the waveguide structure of FIG. 14, taken along line B-B' of FIG. 14.
Figure 16:
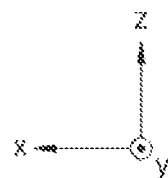
Figure 17:
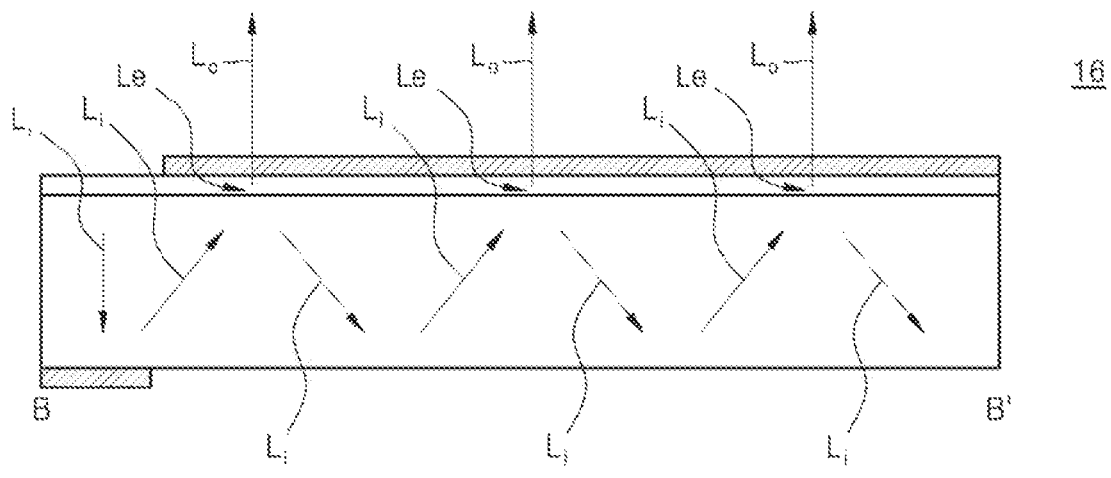
FIG. 17 is a cross-sectional view of the waveguide structure of FIG. 14, taken along line A-A' of FIG. 1 illustrating the path of light in the waveguide structure of FIG. 14.
Figure 17:
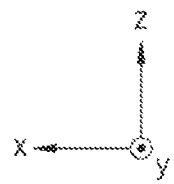

FIG. 14 is a perspective view of a waveguide structure 16 according to an example embodiment. FIG. 15 is an exploded perspective view of FIG. 14. FIG. 16 is a cross-sectional view taken along line B-B' of the waveguide structure 16 of FIG. 14. FIG. 17 is a cross-sectional view taken along line B-B' of FIG. 14 for explaining the path of light in the waveguide structure 16 of FIG. 14. For the concise description, contents substantially the same as those described with reference to FIGS. 1 to 5 may not be described.

Referring to FIGS. 14 to 17, the waveguide structure 16 may be provided. The waveguide structure 16 includes a fourth waveguide layer 140, a fifth waveguide layer 150, the first input grating 210, the second input grating 220, the third input grating 230, and the output grating 500. The first input grating 210, the second input grating 220, and the third input grating 230 may be substantially the same as the first input grating 210, the second input grating 220, and the third input grating 230 described with reference to FIGS. 1 to 3, respectively.

The fourth waveguide layer 140 and the fifth waveguide layer 150 may guide light Li through internal reflection. The fourth waveguide layer 140 and the fifth waveguide layer 150 may be stacked along a height direction (i.e., z direction). The fourth waveguide layer 140 and the fifth waveguide layer 150 may include resin or glass that transmits light Li in the range of about 400 nm to about 2000 nm. The fourth waveguide layer 140 and the fifth waveguide layer 150 may have a refractive index in the range of about 1.2 to about 2.0. The fourth waveguide layer 140 may have a larger refractive index than the fifth waveguide layer 150.

The third input grating 230 may reflect light Li provided from the second input grating 220 and provide the light Li to the interface BS between the fourth waveguide layer 140 and the fifth waveguide layer 150. The third input grating 230 may reflect light Li such that light Li is incident on the interface BS between the fourth waveguide layer 140 and the fifth waveguide layer 150 at an angle greater than the critical angle. Accordingly, the light Li may be totally reflected at the interface BS between the fourth waveguide layer 140 and the fifth waveguide layer 150.

When light Li is totally reflected at the interface BS between the fourth waveguide layer 140 and the fifth waveguide layer 150, evanescent waves $L_e$ may flow into the fifth waveguide layer 150. Evanescent waves $L_e$ may be weak electromagnetic files that pass through an interface where total reflection occurs. In general, evanescent waves can be abruptly attenuated from the interface where total reflection occurs and then disappear. According to the example embodiment, the thickness of the fifth waveguide layer 150 may be sufficiently thin so that evanescent waves $L_e$ may be emitted to the outside of the backlight unit by the output grating 500. For example, the thickness of the fifth waveguide layer 150 may be determined so that evanescent waves $L_e$ reach the output grating.

A waveguide structure 16 including an output grating 500 having uniform light extraction efficiency may be provided. The waveguide structure 16 may emit light $L_O$ of uniform intensity.

Figure 18:
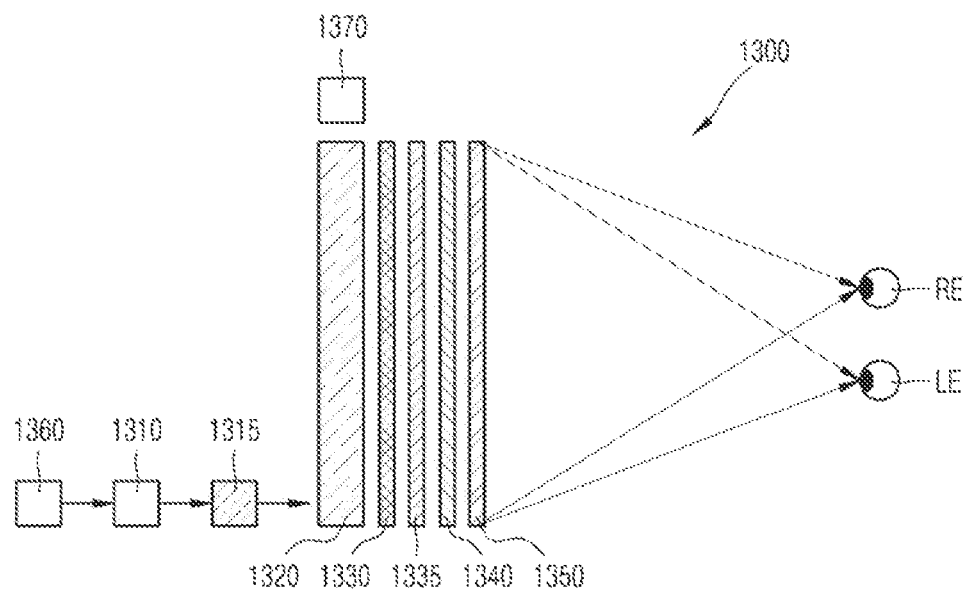
FIG. 18 illustrates a holographic display apparatus according to an example embodiment.

FIG. 18 illustrates a holographic display apparatus 1300 according to an example embodiment. For the concise description, contents substantially the same as those described with reference to FIGS. 1 to 17 may not be described.

The holographic display apparatus 1300 may include a light source 1310 for providing light, a waveguide structure 1320 for guiding light from the light source 1310, and a spatial light modulator 1350 for diffracting light from the waveguide structure 1320 to reproduce a holographic image. The light source 1310 may provide a coherent light beam. The light source 1310 may include, for example, a laser diode. However, if the light has a certain degree of spatial coherence, light can be diffracted and modulated by a spatial light modulator to be coherent light, so other light sources can be used if light having a certain degree of spatial coherence is emitted. The light source 1310 may include a plurality of light sources that emit light of different wavelengths. For example, a first light source that emits light of a first wavelength band, a second light source that emits light of a second wavelength band different from the first wavelength, and a third light source that emits light of a third wavelength different from the first and second wavelengths may be included. Light of the first, second, and third wavelengths may be red, green, and blue light, respectively. As for the waveguide structure 1320, any one of the waveguide structures 11, 12, 13, 14, 15, and 16 described with reference to FIGS. 1 to 17 may be applied, and detailed descriptions are omitted here.

A field lens 1340 for focusing a holographic image reproduced by the spatial light modulator 1350 on a predetermined space may be further provided between the waveguide structure 1320 and the spatial light modulator 1350. In addition, first beam steerer 1330 and second beam steerer 1335 for controlling a traveling direction of light emitted from the waveguide structure 1320 two-dimensionally may be further provided. The first and second beam steerers 1330 and 1335 may adjust the position of the output light beam according to the position of the pupil of the viewer. For example, the first beam steerer 1330 may adjust the horizontal position of the light beam, and the second beam steerer 1335 may adjust the vertical position of the light beam. The first and second beam steerers 1330 and 1335 may be implemented as, for example, a liquid crystal layer or an electrowetting element.

Figure 19:
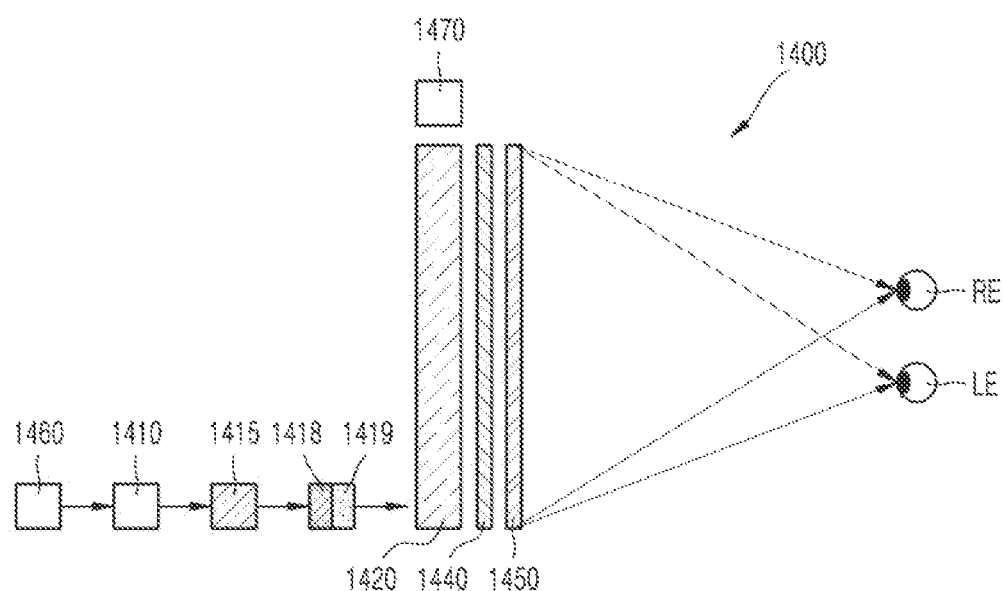
FIG. 19 illustrates a holographic display apparatus according to another example embodiment.

In FIG. 19, the position of the field lens 1340 is illustrated as being located between the second beam steerer 1335 and the spatial light modulator 1350, but is not limited thereto. For example, the field lens 1340 may be disposed between the spatial light modulator 1350 and the viewer.

A beam expander 1315 may be further provided between the light source 1310 and the waveguide structure 1320. For example, the beam expander 1315 may expand and collimate a one point light provided from the light source 1310. The beam expander 1315 may include, for example, a collimating lens. As the divergence angle of the light beam becomes closer to 0 degrees by collimating the light beam, the coherence of light can be increased. Accordingly, the optical beam is collimated by the beam expander 1315, so that the quality of the holographic image may be improved.

The holographic display apparatus 1300 may further include an eye tracking sensor 1370 that recognizes a viewer's position, and may further include a control unit 1360 that controls the first and second beam steerers 1330 and 1335 depending on the position detected by the eye tracking sensor 1370. The eye tracking sensor 1370 may include an infrared camera, a visible light camera, or various other sensors.

The controller 1360 may also control driving of the light source 1310. For example, the control unit 1360 may sequentially control the radiation direction of the light beam so that the holographic image is formed in the left eye and the right eye of the viewer in chronological order.

The holographic display apparatus 1300 according to the example embodiment may provide holographic images having different viewpoints to the left eye LE and the right eye RE of the observer in a binocular hologram method. For example, the holographic display apparatus 1300 provides a holographic image for the left eye to the viewer's left eye LE viewing area, and provides a holographic image for the right eye with a different viewpoint than the holographic image for the left eye to the viewer's right eye RE viewing area. The holographic image for the left eye and the hologram image for the right eye provided by the holographic display apparatus 1300 can provide a three-dimensional effect to the observer independently unlike the left eye image and the right eye image of the stereoscopic method, and only the viewpoints may be different. In the case of the stereoscopic method, when a 2D image for the left eye and a 2D image for the right eye with different viewpoints are perceived by the observer's left and right eyes, respectively, a three-dimensional effect is provided using binocular parallax. Therefore, in the stereoscopic method, a three-dimensional effect does not occur with only one of the left-eye image and the right-eye image, and the depth perception perceived by the brain and the focus of the eyes do not match, which can cause the observer to feel tired. On the other hand, in the holographic display apparatus 1300 according to the example embodiment, since a hologram image for the left eye and a hologram image for the right eye are formed at the position in a predetermined space, that is, the viewer's left eye LE and right eye RE, the depth perceived by the brain and the focus of the eye can be consistent and complete parallax can be provided. The reason why the holographic display apparatus 1300 according to the example embodiment provides only binocular viewpoints is that since the observer can only recognize two viewpoints with the left eye LE and the right eye RE, this is to reduce the amount of data processing by removing the remaining viewpoint information except for the viewpoint information that can be recognized by the observer. However, the holographic display apparatus according to various embodiments may provide more viewpoints.

The position at which the holographic image is focused may be adjusted by the first and second beam steerers 1330 and 1335. For example, by the first and second beam steerers 1330 and 1335, a left eye position at which the left eye hologram image is focused and a right eye position at which the right eye hologram image is focused may be adjusted. Each viewer's unique left-eye and right-eye spacing may be detected by the eye tracking sensor 1370, and a change in the position of the left and right eyes due to the viewer's movement may be detected. According to the detected information, the first and second beam steerers 1330 and 1335 may control the traveling direction of the light beam.

One of the first beam steerer 1330 and the second beam steerer 1335 may be a liquid crystal deflector that diffracts incident light to generate two light beams traveling at different angles. When any one of the first and second beam steerers 1330 and 1335 spatially separates light toward the left and right eyes at the same time, time-sequential driving of the light source LS may not be required.

The field lens 1340 may focus light direction-controlled by the first and second steerers 1330 and 1335 into a predetermined space. The field lens 1340 may include a Fresnel lens, a liquid crystal lens, and a holographic optical element.

The light controlled in the direction by the first and second beam steerers 1330 and 1335 is incident on the spatial light modulator 1350 through the field lens 1340. The spatial light modulator 1350 may play a role of forming a hologram pattern having an interference fringe for modulating incident light. Incident light is diffracted and modulated by the hologram pattern formed by the spatial light modulator 1350, so that a holographic image may be reproduced at a location in a predetermined space.

The holographic display apparatus according to an example embodiment may be applied to, for example, a mobile phone. By using the eye tracking element 1370 and a beam steerer, when the user views the screen of the mobile phone, the movement of the user's eye can be tracked to display a 3D image according to the eye position.

FIG. 19 is a diagram showing a holographic display apparatus 1400 according to another example embodiment.

The holographic display apparatus 1400 may include a light source 1410 for providing light, a waveguide structure 1420 for guiding light from the light source 1410, and a spatial light modulator 1450 for reproducing a holographic image by diffracting light provided from the waveguide structure 1420. The light source 1410 may provide a coherent light beam. In the waveguide structure 1420, the example described with reference to FIGS. 1 to 8 may be applied, and detailed descriptions are omitted here.

A field lens 1440 for focusing a holographic image reproduced by the spatial light modulator 1450 on a predetermined space may be further provided between the waveguide structure 1420 and the spatial light modulator 1450.

A beam expander 1415 may be further provided between the light source 1410 and the waveguide structure 1420. The beam expander 1415 may expand and collimate one point light provided from the light source 1410.

In addition, first and second beam steerers 1418 and 1419 may be further provided between the light source 1410 and the waveguide structure 1420 to control the traveling direction of light in two dimensions. The first and second beam steerers 1418 and 1419 may adjust the position of the output light beam according to the position of the pupil of the viewer. For example, the first beam steerer 1418 may adjust the horizontal position of the light beam, and the second beam steerer 1419 may adjust the vertical position of the light beam.

The holographic display apparatus 1400 may further include an eye tracking sensor 1470 that recognizes a viewer's position, and may further include a control unit 1460 that controls the first and second beam steerers 1418 and 1419 depending on the position detected by the eye tracking sensor 1470.

The controller 1460 may also control driving of the light source 1410. For example, the control unit 1460 may sequentially control the radiation direction of the light beam so that the holographic image is formed in the left eye and the right eye of the viewer in chronological order.

When comparing FIG. 18 and FIG. 19, the beam steerer is positioned differently, and components having the same numbers perform substantially the same functions and operations, and thus detailed descriptions thereof will be omitted.

The backlight unit according to the example embodiment may be applied to a holographic display, a mobile phone, a 3D TV, or the like. In the holographic display apparatus according to the example embodiment, light uniformity may be improved and band patterns may be reduced by a waveguide structure in which a plurality of layers are stacked.

The example embodiments may provide a waveguide structure including output grating that has a constant light extraction efficiency and emits light of a uniform intensity.

The example embodiments may provide a back light unit including output grating that has a constant light extraction efficiency and emits light of a uniform intensity.

The example embodiments may provide a display apparatus including a backlight unit that emits light of uniform intensity.

However, the effects of the disclosure are not limited to the above descriptions.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A waveguide structure comprising:
   an output grating;
   a polarization conversion element disposed parallel to the output grating; and
   a polarization separation element provided between the output grating and the polarization conversion element, wherein the polarization separation element is configured to transmit, to the output grating, light having a first polarization direction among light incident on the polarization separation element, and reflect, to the polarization conversion element, light having a second polarization direction different from the light having the first polarization direction among the light incident on the polarization separation element to provide the light having the second polarization direction to the polarization conversion element, and wherein the polarization separation element comprises:
   a first area having a uniform first light transfer efficiency; and
   a second area having a uniform second light transfer efficiency that is greater than the uniform first light transfer efficiency.

2. The waveguide structure of claim 1, wherein the polarization separation element comprises a reflective wire-grid polarizer.

3. The waveguide structure of claim 1, wherein the polarization separation element comprises a polarization grating.

4. The waveguide structure of claim 3, further comprising a quarter wave plate provided between the polarization separation element and the output grating.

5. The waveguide structure of claim 1, wherein the polarization separation element comprises a dielectric coating.

6. The waveguide structure of claim 1, wherein the polarization conversion element comprises a half wave plate or a full wave plate.

7. The waveguide structure of claim 1, wherein the polarization conversion element comprises an active wave plate.

8. The waveguide structure of claim 1, wherein the output grating comprises a volume grating.

9. The waveguide structure of claim 1, wherein the output grating has a uniform light extraction efficiency.

10. The waveguide structure of claim 1, further comprising:
   a first input grating provided adjacent to the polarization conversion element,
   wherein the first input grating is configured to provide light to the polarization separation element, and
   wherein the first area is closer to the first input grating than the second area.

11. The waveguide structure of claim 1, further comprising:
   a first waveguide layer provided between the polarization separation element and the polarization conversion element; and
   a second waveguide layer provided between the output grating and the polarization separation element.

12. The waveguide structure of claim 11, wherein a refractive index of the first waveguide layer is equal to a refractive index of the second waveguide layer.

13. The waveguide structure of claim 11, further comprising:
   a third waveguide layer provided between the first waveguide layer and the polarization conversion element,
   wherein a refractive index of the third waveguide layer is greater than a refractive index of the first waveguide layer.

14. The waveguide structure of claim 11, further comprising:
   a first input grating configured to provide light to the polarization separation element;
   a second input grating configured to provide light provided from outside to the first waveguide layer and the second waveguide layer; and
   a third input grating configured to reflect light provided from the second input grating and provide the reflected light to the first input grating,
   wherein, in a stacking direction of the first waveguide layer and the second waveguide layer, the first input grating, the second input grating, and the third input grating are spaced apart from the polarization separation element.

15. A backlight unit comprising:
a light source; and
a waveguide structure comprising:
   an output grating;
   a polarization conversion element provided parallel to the output grating; and
   a polarization separation element provided between the output grating and the polarization conversion element,
   wherein the polarization separation element is configured to transmit, to the output grating, light having a first polarization direction among light incident on the polarization separation element, and reflect, to the polarization conversion element, light having a second polarization direction different from the light having the first polarization direction among the light incident on the polarization separation element to provide the light having the second polarization direction to the polarization conversion element, and
wherein the waveguide structure is configured to expand light provided from the light source and output light of a uniform intensity, and
wherein the polarization separation element comprises:
   a first area having a uniform first light transfer efficiency; and
   a second area having a uniform second light transfer efficiency that is greater than the uniform first light transfer efficiency.

16. A display apparatus comprising:
a light source;
a waveguide structure comprising:
   an output grating;
   a polarization conversion element provided parallel to the output grating; and
   a polarization separation element provided between the output grating and the polarization conversion element,
wherein the polarization separation element is configured to transmit, to the output grating, light having a first polarization direction among light incident on the polarization separation element, and reflect, to the polarization conversion element, light having a second polarization direction different from the light having the first polarization direction among the light incident on the polarization separation element to provide the light having the second polarization direction to the polarization conversion element,
wherein the polarization separation element comprises:
   a first area having a uniform first light transfer efficiency; and
   a second area having a uniform second light transfer efficiency that is greater than the uniform first light transfer efficiency, and
   wherein the waveguide structure is configured to expand light provided from the light source and output light of a uniform intensity; and a spatial light modulator configured to diffract light provided from the waveguide structure to provide a holographic image.

17. A waveguide structure comprising:
an output grating;
a polarization conversion element provided parallel to the output grating;
an input grating provided adjacent to the polarization conversion element; and
a polarization separation element provided between the output grating and the polarization conversion element, the polarization separation element comprising a first area and a second area,
wherein the polarization separation element is configured to transmit, to the output grating, light having a first polarization direction among light incident on the polarization separation element, and reflect, to the polarization conversion element, light having a second polarization direction different from the light having the first polarization direction among the light incident on the polarization separation element to provide the light having the second polarization direction to the polarization conversion element,
wherein the first area of the polarization separation element is closer to the input grating than the second area of the polarization separation element, and
wherein a uniform first light transfer efficiency of the first area is less than a uniform second light transfer efficiency of the second area.

* * * * *